United States Patent Office 3,626,563
Patented Dec. 14, 1971

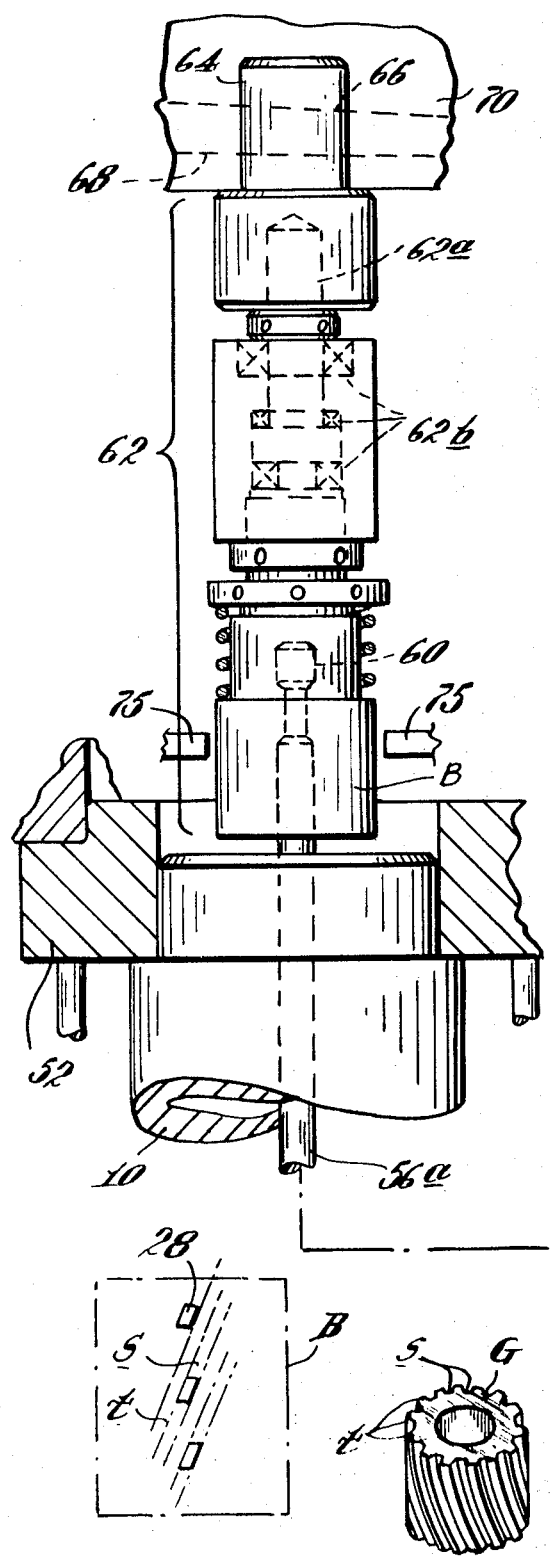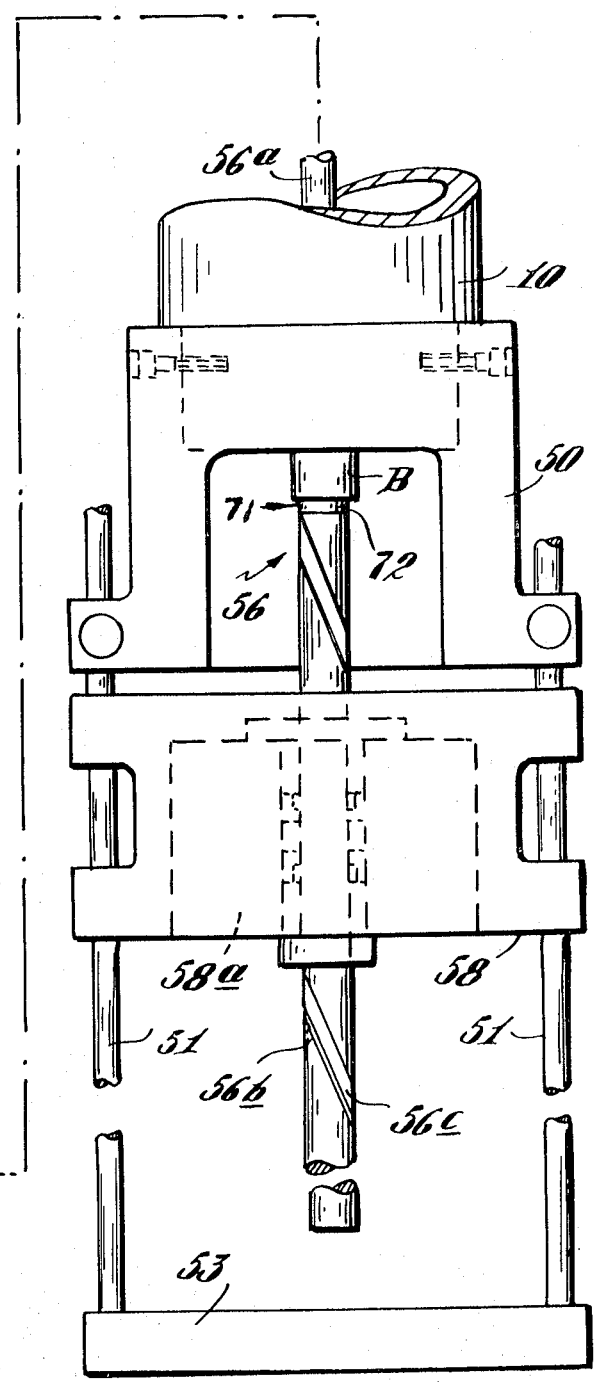
Fig. 8
Fig. 9
Fig. 10

3,626,563
POT BROACH
Reino G. Lehto, Maynard, and Robert L. Schneider, Hudson, Mass., assignors to The Lapointe Machine Tool Company, Hudson, Mass.
Filed Jan. 2, 1970, Ser. No. 223
Int. Cl. B26d 1/04
U.S. Cl. 29—95.1                                    9 Claims

ABSTRACT OF THE DISCLOSURE

A tool comprising a plurality of broach bars having teeth along one edge and a holder supporting the bars with the toothed edges at equal radial distances from a common axis so that the toothed edges collectively form an internal broach.

BACKGROUND OF THE INVENTION

Pot broaches, through which a blank is drawn to reduce it to a predetermined size and/or to form a thread or spline thereon are old in the art. Most of the patents relating to such broaches are of the kind wherein a plurality of annular washer-like cutters are stacked in a holder and held clamped therein against rotational and longitudinal movement as shown, for example, in the U.S. Pat. Nos. 3,327,589; 3,331,115; 3,022,710; 3,332,129 and Re. No. 24,284.

The washer-like cutters have a tendency to bow and this cannot be wholly eliminated by applying longitudinal pressure to the ends of the stack. Consequently, when a work piece is drawn through a pile of such washers the individual washers are successively deflected causing vibration and chatter which interferes with maintaining a high degree of accuracy in the finished piece. In addition, it is difficult to maintain a tolerance in the manufacture of the individual washer which will be close enough so that collectively the tolerances do not exceed an allowable maximum. Also, because of the minute spaces produced by deflection of the washers as the work is drawn through, small pieces of metal and dirt accumulate between the washers and this too interferes with efficient operation of the broach, reduces cutting speed and results in scars or scratches on the surface of the finished piece. The broach forming the subject matter of this invention is designed to eliminate the disadvantages characteristic of the washer type broach assembly.

SUMMARY OF THE INVENTION

As herein illustrated, the broach comprises a plurality of elongate bars, with cutting teeth along one edge, supported with their toothed edges equidistant from a common axis and collectively forming an internal broach. The teeth on each bar lie along a straight line longitudinally of the bar and at a uniform spacing corresponding to the pitch of the thread or teeth to be formed divided by the number of teeth. The bars are substantially wedge shaped in cross-section so that when assembled they collectively form an annular sleeve with the teeth extending radially inwardly relative to the axis thereof. The outer edges of the bars are cylindrical and there is a holder containing a cylindrical hole adapted to receive the bars and to hold them annularly disposed with respect to the aforesaid longitudinal axis. There is means associated with the holder and one of the bars for predetermining its position in relation to the axis of the holder which thus determines the positions of the remaining bars, means for securing each bar against the inner side of the holder when placed therein and means at the ends of the holder for locking the bars in position. There may be one or more sets of bars disposed end to end in the holder and in any given length of bar, the teeth increase in height progressively from one end to the other.

Figure 1:
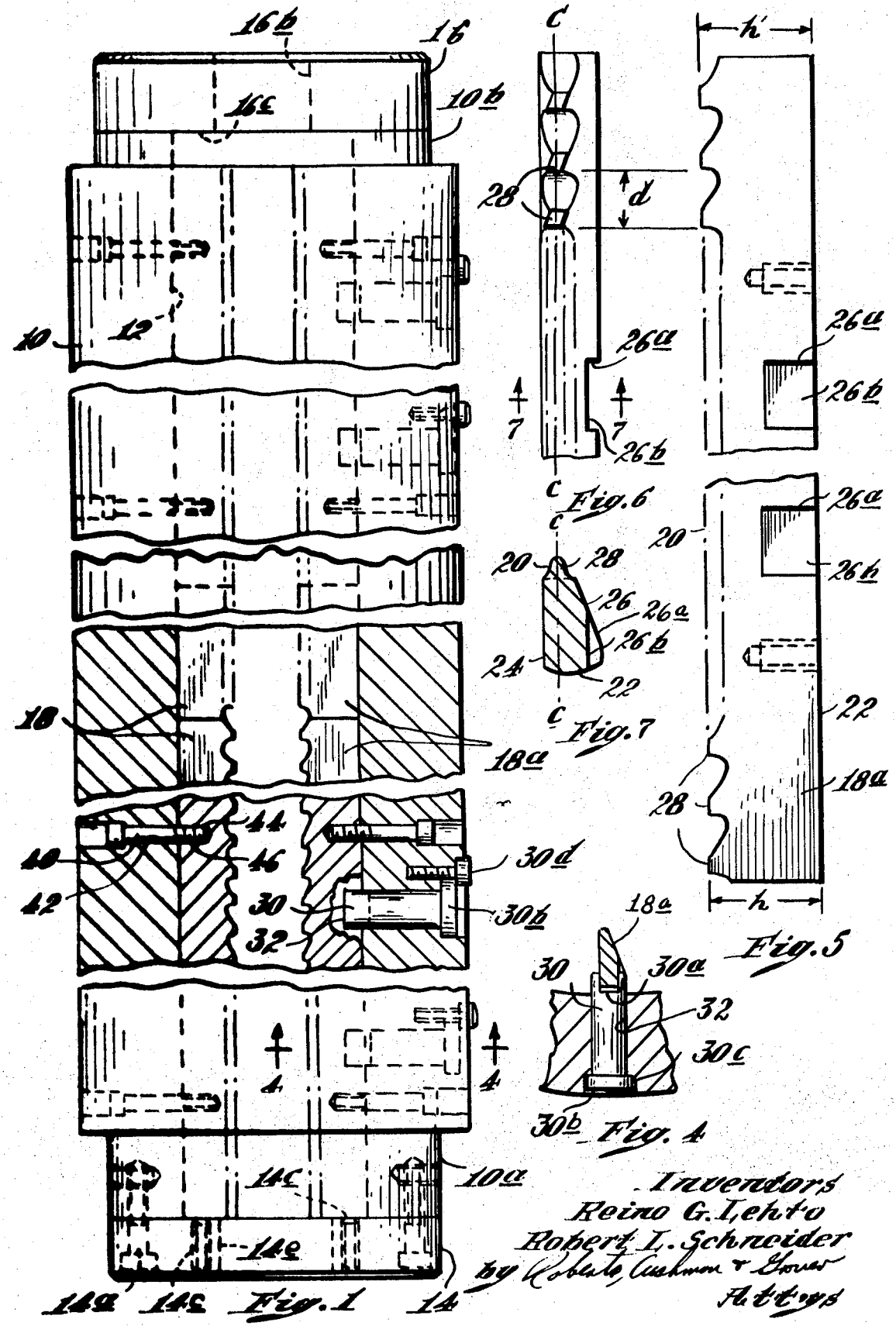
Figure 2:
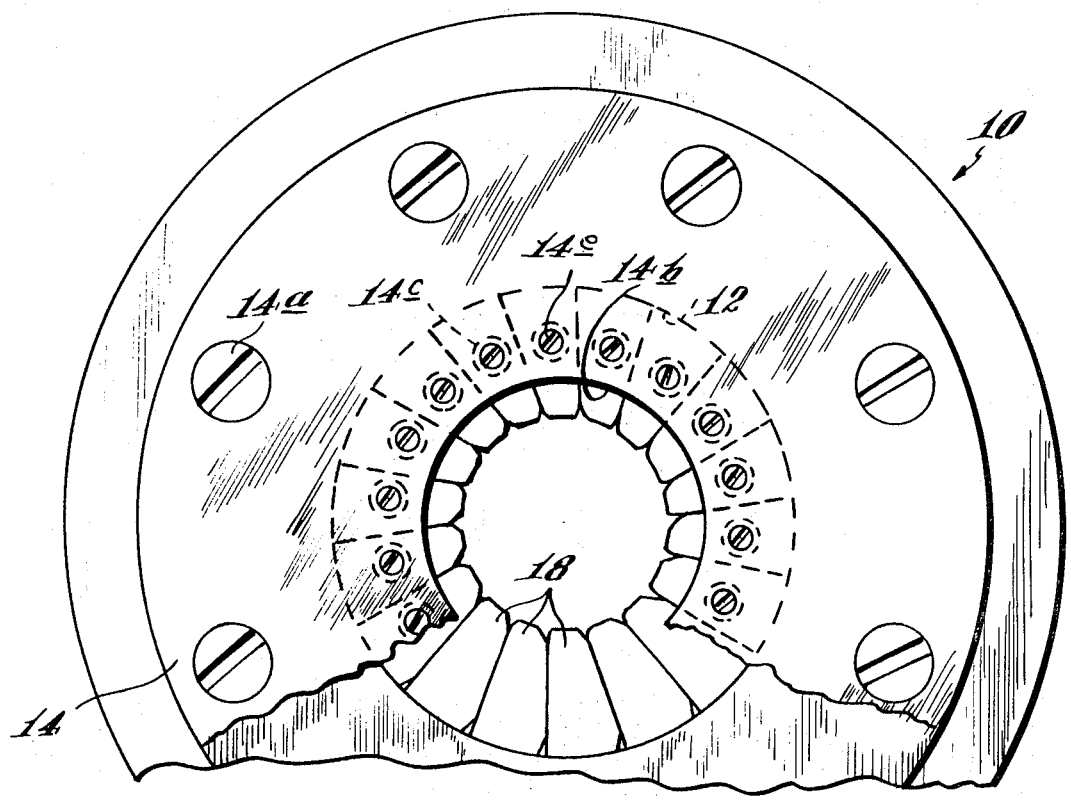
Figure 3:
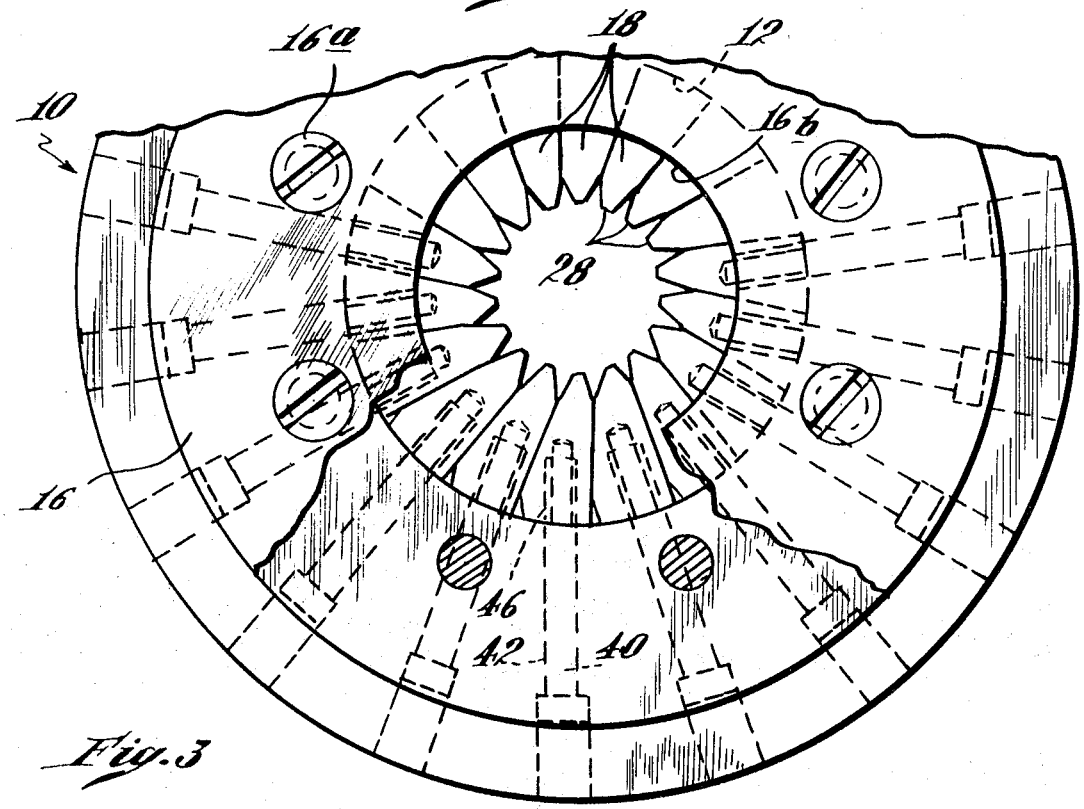

The invention will now be described in greater detail with reference to the accompanying drawing wherein:

FIG. 1 is an elevation of the broach assembly;
FIG. 2 is a view of the left end of the broach assembly shown in FIG. 1;
FIG. 3 is a view of the right end of the broach assembly shown in FIG. 1;
FIG. 4 is a fragmentary section taken on the line 4—4, FIG. 1;
FIG. 5 is an elevation of an individual broach bar as seen from one side;
FIG. 6 is a fragmentary elevation of the broach bar as seen from the top;
FIG. 7 is a transverse section of the broach bar taken on the line 7—7 of FIG. 6;
FIG. 8 is a broken elevation of apparatus with which the broach assembly is used to effect a broaching operation of the exterior surface of a cylindrical object;
FIG. 9 is a perspective of a helical toothed gear formed by drawing a blank through the broach assembly; and
FIG. 10 is a plan view diagrammatically illustrating a blank and the in-line relation of the cutting teeth along one broach bar to the teeth being formed.

Referring to the drawing the holder 10 is an elongate cylindrical structure of appropriate length containing longitudinally thereof a hole 12 of circular cross-section and of uniform diameter from end to end. At opposite ends the structure has portions 10a and 10b of reduced diameter the end faces of which are uniformly flat and have bolted thereto respectively annular caps 14 and 16 which are adapted to hold a plurality of elongate broach bars within the structure by engagement with the ends of the broach bars.

Each broach bar 18 FIGS. 5 and 7, has parallel edges 20 and 22 and side surfaces 24 and 26. The edge 20 has cutting teeth 28 longitudinally thereof along a straight line one behind the other and at a spacing $d$ corresponding to the pitch divided by the number of teeth to be formed. The teeth 28 increase progressively in height from a height $h$ at one end to a height $h'$ at the other.

The edge 22 of each bar is arcuate having a radius of curvature corresponding substantially to that of the hole in the holder and the side surfaces 24 and 26 converge from the edge 22 toward the edge 20. For convenience in manufacture the side surface 24 is parallel to the median plane represented by the line C—C, FIGS. 6 and 7, which contains the apices of the teeth and the side surface 26 is inclined thereto at an angle such that when the bars are assembled within the hole 12 they collectively form an annular sleeve, the outside diameter of which corresponds substantially to the inside diameter of the hole in the holder and the inside of which is comprised of the teeth 28.

To insure correct location of the broach bars in the holder the position of one bar is predetermined and the remainder are mounted in the holder side by side by employing the prepositioned bar as an index for locating the remaining bars. To this end a single broach bar 18a shown at the bottom of the holder in FIG. 1 is located at a predetermined position in the holder by a plurality of studs 30 inserted through radial holes 32 in the holder in axially spaced position therealong, two such studs being shown for each of the three bars disposed end to end along the holder. Each stud 30, FIG. 4, has at its inner end a slot 30a adapted to receive the outer edge 24 of the bar 18a and thus to hold it at that position against displacement and for this purpose the sloping side surface 26 is provided with recesses 26a having bottom surface 26b parallel to the side surface 24 so that the outer edge of the recesses will fit into the slots 30a which are rectangular in section. The outer end of each stud 30 has a head 30b which sets into an enlarged opening 30c and is adjustably held therein by a screw bolt 30d screwed into the holder adjacent the opening 30c so as to engage the head 30b. When a broach bar 18a has been mounted in the holder in the slots 30a of the studs 30 the latter are mounted in the hole, side surface to side surface, to form a complete circle of bars.

In assembling the broach bars in the holder the cap 16, FIG. 3, is secured to the portion 10b of the holder by means of bolts 16a and as illustrated contains an opening 16b the diameter of which is less than the opening of the holder but greater than the inside diameter of the broach so that it provides an annular shoulder 16c, FIG. 1, against which the ends of the broach bars can be marshalled. The cap 14 is removed to permit the bars to be inserted and after the bars have been inserted is bolted in place by means of bolts 14a, FIGS. 1 and 2. The cap 14 has an opening 14b which is smaller in diameter than the hole in the holder but larger in diameter than the hole in the broach so that it too provides a shoulder 14c for engagement with the ends of the broach bars.

Each broach bar is held against the inner surface of the hole in the holder by a pair of radially disposed bolts 40, FIGS. 1 and 3, inserted through radial holes 42 in the holder, the bolts having at their inner ends threaded portions 44 which screw into threaded holes 46 in the edges 22 of the broach bars. By tightening the bolts 40 down they pull the broach bars tightly against the wall of the hole. In order to insure locking of the bars against longitudinal movement the cap 14 is provided with a plurality of circularly arranged holes 14c substantially midway between the outer and inner sides of the circular array of broaches and a corresponding number of screw bolts 14e are threaded through the hole 14c into engagement with the ends of the broaches. By rotating the screw bolts 14e the broaches may be fixed against the cap 16. In practice the bolts 40 are not fully tightened until the bolts 14c have been tightened to fix the longitudinal position of the bars.

The holder as herein illustrated contains three sets or arrays of broach bars located tandemly; however, it is to be understood that a lesser or greater number of sets of broach bars may be employed. The teeth of each set of broach bars increases in height from the left end as seen in FIG. 1 toward the right end and uniformly from one set of bars to the next. The overall length of the broach, whether it is comprised of a single array of broach bars or several arrays, is designed to complete the broaching operation in a single pass of the blank through it without excessive strain on the teeth and/or excessive heating. Also, in accordance with conventional practice tooth clearances are provided for free discharge of chips.

As herein illustrated the broach is designed for the purpose of making helical gears by moving a blank on which the helical teeth are to be cut and the broach relative to each other so as to move the toothed surface of the broach over the exterior surface of the blank. The broach may be supported either in a horizontal or vertical position the latter being illustrated herein. Referring to FIG. 8 the holder 10 is shown in a vertical position being supported at its lower end in a block 50 mounted on spaced parallel posts 51—51 the lower ends of which are fixed to a base 53. The upper end of the broach is secured in a bushing 52, the latter being secured to the aforesaid post 51—51. A drawbar 56 is provided for moving the blank through the broach and for this purpose is supported at its lower end in a bearing block 58 slidable vertically on the posts and movable thereon by suitable means, for example, screws or hydraulically operated rams. The drawbar 56 has at its upper end a head 60 adapted to be rotatably engaged within a coupling assembly 62 the latter in turn being provided with a stud 64 containing a diametrical slot 66 for receiving a key 68 by means of which it is connected to a ram 70. Vertical reciprocation of the ram 70 will thus move the drawbar up and down relative to the broach.

The drawbar has a part 56a of small enough diameter to permit placing the blank B over it, and a part 56b which comprises a bearing for guiding its lower end as it is moved vertically. To form helical teeth it is necessary to rotate the blank B as it is moved through the broach and to effect rotation of the drawbar, the bearing 56b is in the form of a lead screw provided with the helical grooves 56c and the bearing block 58 embodies a nut 58a containing helical threads with which the grooves 56c mesh.

At the junction of the lower end of the drawbar 56a with the upper end of the lead screw 56b, there is an annular shoulder 71 on which is supported a friction washer 72 the opposite surfaces of which are serrated. The blank B which is to be cut is disposed on the drawbar against the washer 72 and is prevented from rotating on the drawbar as it is drawn through the broach by frictional engagement of the serrated surfaces of the washer respectively with the face of the blank next to it and with shoulder 71.

There is means for intercepting the completed gear at the upper end of the broach to hold it while the drawbar returns to its initial position so that the finished gear is not drawn through the broach a second time. This means comprises a pair of transversely disposed jaws 75—75 arranged to move under the lower side of the gear at its uppermost position. In operation after the gear has been moved completely through the broach the ram 70 continues to raise the drawbar until the gear rises above the aforesaid jaws, allowing the jaws to move together beneath it and then reverses. Following engagement of the gear with the retaining jaws the coupling 62 is automatically operated in conventional fashion to release the head of the drawbar, whereupon the latter is drawn downwardly by movement of the bearing block 58 downwardly on the posts 51—51 which carries the nut with it. The bearing block 58 carries the drawbar all the way down until the head 60 clears the lower end of the broach whereupon a new blank is placed over the head and the bearing block is moved up to the lower side of the block 50 before the next broaching operation is commenced.

A helical toothed gear G such as is formed by drawing a blank B through the broach assembly as described above is shown in FIG. 9. FIG. 10 shows diagrammatically the in-line relation of the teeth 28 along a single broach bar operating on the surface of the blank B as it is drawn through the assembly, the portions marked t representing the faces of the teeth and the portions marked s representing the grooves between the teeth. As illustrated the teeth are inclined to the axis of the broach at an angle corresponding to the angle of the helix to be formed.

While the broach as herein illustrated is designed for the purpose of forming helically arranged teeth or a helical thread it may be desirable to effect an overall reduction of a blank or to form a straight groove or grooves in the surface of a blank and therefore is within the scope of the invention to support the drawbar so that it will not rotate as it is moved vertically.

What is claimed is:

1. A broach comprising a plurality of elongate bars, a holder for said bars containing a smooth wall cylindrical hole, each bar being wedge-shaped in cross section and having flat converging sides and substantially parallel edges, one edge having a curved surface corresponding in radius of curvature to the radius of curvature of the cylindrical hole and the other having teeth lengthwise thereof, said bars being arranged in said hole side-by-side and collectively constituting an annulus wherein the sides of the bars are engaged and provide mutual support for each other, the outer curved edges engage the correspondingly curved surface of the hole and the tooth edges are disposed about the longitudinal axis of the holder and define an internal broach opening through which a part is adapted to be moved to effect surface broaching thereof, said teeth along each bar lying along a straight line, being uniformly spaced and increasing progressively in height from one end to the other.

2. A broach according to claim 1 wherein the holder contains radially disposed holes and wherein bolts are supported in the holes with their inner ends threaded into the outer edges of the bars, said bolts binding the outer edges of the bars against the surface of the hole.

3. A broach according to claim 1 wherein one side is parallel to said radius and the other is inclined thereto.

4. A broach according to claim 3, wherein one of said bars contains in the inclined side surface longitudinally spaced recesses having flat surfaces parallel to the other side surface and there are radial holes in the holder in which there are positioning members having at their inner ends slots of rectangular cross-section adapted to engage said bar at said recessed portions thereof for locating the position of said bar at a pre-determined position in the holder.

5. A broach according to claim 1, wherein the number of bars correspond to the number of teeth to be formed and the spacing of the teeth on each bar corresponds to the pitch of the helix of the teeth to be formed divided by the number of teeth to be formed.

6. The combination with a plurality of bars having teeth along one edge, assembled with their toothed edges at equal radial distances from a common axis, of a holder for supporting the bars in said relation, means on the holder to locate one bar at a pre-determined position, said remaining bars being adapted to be assembled in the holder relative to said one bar and to be held disposed therein by interengagement of the successive bars with each other and with said one bar and means on the holder engaged with the ends of the bars outwardly of the toothed edges thereof, operable to lock the bars against longitudinal movement in the holder.

7. The combination with a plurality of bars having spaced parallel edges of a cross-section such that when assembled side by side they collectively form a hollow cylinder, said bars having at the edges located at the inner side of the cylinder teeth, which collectively form an internal broach and at the edges located at the outer side arcuate surfaces which collectively form a substantially continuously cylindrical surface, the radius of curvature of which coincides with the axis of the broach; of a holder containing a cylindrical hole adapted to receive the assembled bars with their arcuate surfaces seated against the interior thereof, means associated with the holder and the bars to fix the arcuate surfaces against the interior of the holder, and means at the ends of the holder operable by engagement with the ends of the bars to fix their longitudinal position in the holder.

8. A broach according to claim 1, wherein the teeth along each broach bar are inclined to the axis of the broach assembly at an angle corresponding to the angle of the helix to be formed.

9. A broach assembly according to claim 1, wherein the assembly is provided with a sufficient number of arrays of broach bars longitudinally thereof to completely finish cutting a blank in one pass through the broach assembly.

References Cited

UNITED STATES PATENTS

| | | | |
|---|---|---|---|
| 2,525,098 | 10/1950 | Hougland | 29—106 |
| 2,587,570 | 2/1952 | Iverson | 29—95.1 |
| 2,940,159 | 6/1960 | Eklund | 29—95.1 |
| 3,341,918 | 9/1967 | Mansfield et al. | 29—95.1 |

FOREIGN PATENTS

| | | | |
|---|---|---|---|
| 704,466 | 2/1931 | France | 29—95.1 |

HARRISON L. HINSON, Primary Examiner